United States Patent
Kano

(10) Patent No.: US 9,749,523 B2
(45) Date of Patent: Aug. 29, 2017

(54) PHOTOGRAPHING APPARATUS, PHOTOGRAPHING METHOD, IMAGE PROCESSOR, IMAGE-PROCESSING METHOD, AND PROGRAM

(71) Applicant: RICOH IMAGING COMPANY, LTD., Tokyo (JP)

(72) Inventor: Hiroshi Kano, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 15/138,513

(22) Filed: Apr. 26, 2016

(65) Prior Publication Data

US 2016/0344945 A1    Nov. 24, 2016

(30) Foreign Application Priority Data

May 19, 2015 (JP) .................................. 2015-101685

(51) Int. Cl.
*H04N 5/232* (2006.01)
*G06T 5/50* (2006.01)

(52) U.S. Cl.
CPC .......... *H04N 5/23229* (2013.01); *G06T 5/50* (2013.01)

(58) Field of Classification Search
CPC .............. H04N 5/23229; H04N 3/155; H04N 5/23232; H04N 5/23235; H04N 1/60; H04N 17/002; H04N 5/2355; H04N 5/2356; G06T 5/50; G06K 9/3275; G08B 13/19663

See application file for complete search history.

(56) References Cited

U.S. PATENT DOCUMENTS

| | | | |
|---|---|---|---|
| 6,661,932 B2 | 12/2003 | Horikoshi | |
| 2006/0061845 A1* | 3/2006 | Lin | H04N 5/2355 358/540 |
| 2012/0086829 A1* | 4/2012 | Hohjoh | H04N 5/772 348/223.1 |

FOREIGN PATENT DOCUMENTS

| | | |
|---|---|---|
| JP | 3193258 B2 | 5/2001 |
| JP | 2010-034964 | 2/2010 |

* cited by examiner

*Primary Examiner* — Mekonnen Dagnew
(74) *Attorney, Agent, or Firm* — Greenblum & Bernstein, P.L.C.

(57) ABSTRACT

A photographing apparatus includes an image sensor which images a plurality of images; an image processor configured to set one image as a reference image and each remaining image as a comparative image; an image processor configured to generate a reference map divided into blocks; an image processor configured to generate a comparative map divided into blocks; an image processor configured to generate a change-detection map indicating coinciding or non-coinciding blocks between the reference map and the comparative map, per each respective block, upon the reference map and the comparative map being compared; an image processor configured to obtain a synthesized image of the images; and an image processor configured to replace at least a part of the synthesized image with a corresponding part of the reference image based on the change-detection map.

13 Claims, 12 Drawing Sheets

Fig. 4A

| R | Gr | R | Gr |
|---|---|---|---|
| Gb | B | Gb | B |
| R | Gr | R | Gr |
| Gb | B | Gb | B |

Fig. 4B

| R | Gr | R | Gr |
|---|---|---|---|
| Gb | B | Gb | B |
| R | Gr | R | Gr |
| Gb | B | Gb | B |

Fig. 4C

| R | Gr | R | Gr |
|---|---|---|---|
| Gb | B | Gb | B |
| R | Gr | R | Gr |
| Gb | B | Gb | B |

Fig. 4D

| R | Gr | R | Gr |
|---|---|---|---|
| Gb | B | Gb | B |
| R | Gr | R | Gr |
| Gb | B | Gb | B |

Noise Removal Process

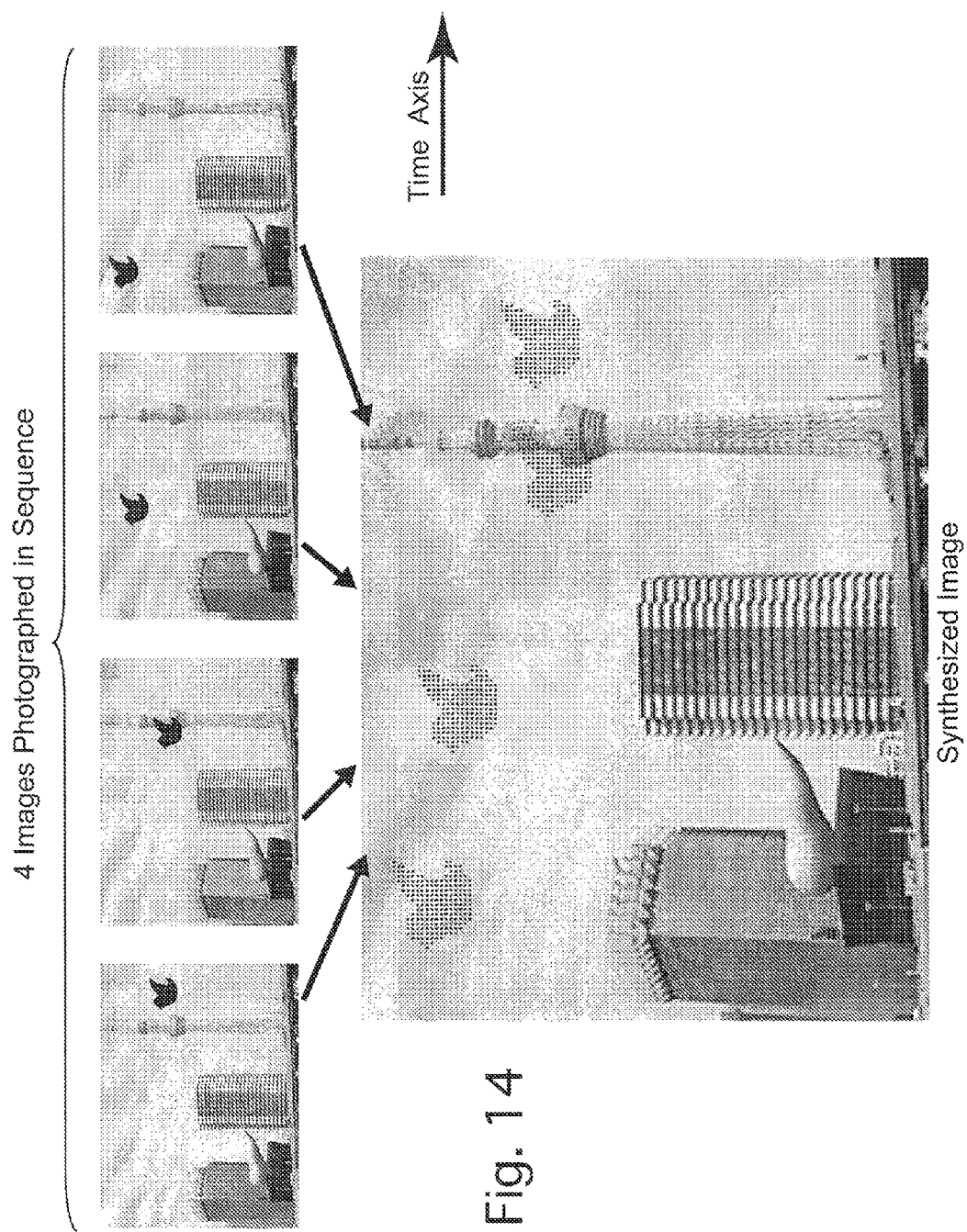

PHOTOGRAPHING APPARATUS, PHOTOGRAPHING METHOD, IMAGE PROCESSOR, IMAGE-PROCESSING METHOD, AND PROGRAM

BACKGROUND OF THE INVENTION

1. Field of the Invention

The present invention relates to a photographing apparatus, a photographing method, an image processor, an image-processing method, and a program.

2. Description of Related Art

In recent years, a photographing technology called "multi-shot synthesis" (multiple-exposure synthesis) has become known in the art, in which a synthesized image is obtained by synthesizing a plurality of sequentially photographed (imaged) images in order to obtain an image that has a higher definition (higher picture quality and higher precision) than an ordinary "single-shot" image (single photographic image).

For example, in Patent Literature 1, two methods of multi-shot synthesis are disclosed: a pixel shifting method, and a picture-frame dividing method. In the pixel shifting method, a plurality of input image signals are obtained by shifting pixels by a decimal fraction of a pixel (e.g., by a ½-pixel pitch) in horizontal and vertical directions relative to the optical axis at the image sensor, and synthesizing these image signals. In the picture-frame dividing method, a single picture frame is obtained by dividing the image by a plurality of times in the vertical and horizontal directions, and a plurality of image signals are synthesized by connecting the divided areas at the divided boundaries thereof.
Patent Literature 1: Japanese Patent No. 3,193,258

Multi-shot synthesis is, by nature, assumed to have no change in the imaging conditions (the object does not move, the camera does not shake or vibrate, no obstacles occur, or no change in illumination, etc.) when a plurality of images are captured sequentially.

However, contrary to above assumption with regard to multi-shot synthesis, large changes in the imaging conditions sometimes occur (such as the object moving by a large amount, the camera shaking or vibrating by a large amount, an obstacle(s) occurring, or a large change in illumination, etc.) when a plurality of images are captured sequentially. If such a case occurs, upon the images being synthesized, an anomalous pattern occurs at an area of the picture frame where such changes have occurred that would not normally occur with normal photography, significantly deteriorating the image quality compared to an ordinary single-shot image.

FIG. 14 shows an example of a failed attempt of multi-shot synthesis. In FIG. 14, a bird has traversed the picture from the right side to the left side during sequential photography of four images. For example, if a pixel shifting method is used, since the information on the shot images that have had their pixel positions shifted is interpolated per unit of pixel pitch, a net pattern is generated along the path where the bird has traversed.

SUMMARY OF THE INVENTION

The present invention has been devised in view of the above-described problem, and provides a photographing apparatus, a photographing method, an image processor, an image-processing method, and a program which can favorably carry out multi-shot synthesis by synthesizing a plurality of sequentially photographed images to obtain a synthesized image.

According to an aspect of the present invention, a photographing apparatus is provided, including an image sensor which sequentially images a plurality of images; an image processor which is configured to set one image of the plurality of images as a reference image, and to set each remaining image of the plurality of images as a comparative image; an image processor which is configured to generate a reference map by dividing the reference image into a plurality of blocks; an image processor which is configured to generate a comparative map by dividing the comparative image into a plurality of blocks; an image processor which is configured to generate a change-detection map which indicates one of a coinciding block and a non-coinciding block between the reference map and the comparative map, per each respective the plurality of blocks thereof, by performing a comparison operation between the reference map and each comparative map being per each respective the plurality of blocks thereof; an image processor which is configured to obtain a synthesized image by synthesizing the plurality of images; and an image processor which is configured to replace at least a part of the synthesized image with a corresponding part of the reference image based on the change-detection map.

It is desirable for the image processors to serve as a single image processor.

It is desirable for a plurality of the comparative maps to be provided with respect to one the reference map, wherein the image processor that is configured to generate a change-detection map is configured to generate a plurality of the change-detection maps in a comparison operation between the one reference map and the plurality of change-detection maps, and for the photographing apparatus to include an image processor which is configured to logical-sum synthesize the plurality of the change-detection maps.

It is desirable for the image processor that is configured to generate a change-detection map to be configured to generate a plurality of loops of change-detection maps in a comparison operation between the one reference map and each the change-detection map, wherein a configuration of the comparison operation has been changed at each of the plurality of loops of change-detection maps, and for the photographing apparatus to include an image processor which is configured to logical-sum synthesize the plurality of loops of change-detection maps.

It is desirable for the photographing apparatus to include an image processor which is configured to remove noise from the change-detection map.

It is desirable for the photographing apparatus to include an image processor which is configured to perform a blurring process at border areas between the coinciding blocks and the non-coinciding blocks of the change-detection map.

It is desirable for the plurality of images to have been imaged using an image sensor which is configured to convert an object image formed by the photographing optical system into electrical pixel signals. At least one of the image sensor and an optical element, which constitutes at least part of the photographing optical system, constitutes a movable member. The image sensor images the plurality of images while the movable member is moved in a direction that is different from that of the optical axis of the photographing optical system with object-emanating light rays being made incident on a plurality of pixels, having different detection colors, of the image sensor upon each movement of the movable member.

In an embodiment, a photographing method is provided, including sequentially imaging a plurality of images; setting one image of the plurality of images as a reference image, and setting each remaining image of the plurality of images as a comparative image; generating a reference map by dividing the reference image into a plurality of blocks; generating a comparative map for each the comparative image by dividing each the comparative image into a plurality of blocks;

generating a change-detection map which indicates one of a coinciding block and a non-coinciding block between the reference map and the comparative map, per each respective the plurality of blocks, by performing a comparison operation between the reference map and the comparative map per each respective the plurality of blocks thereof; obtaining a synthesized image by synthesizing the plurality of images; and replacing at least part of the synthesized image with a corresponding part of the reference image based on the change-detection map.

In an embodiment, an image processor is provided, which is configured to set one image of a plurality of images, which have been sequentially imaged, as a reference image and set each remaining image of the plurality of images as a comparative image; is configured to generate a reference map of the reference image, the reference map being divided into a plurality of blocks; is configured to generate a comparative map of the comparative image, the comparative map being divided into a plurality of blocks; is configured to generate a change-detection map which indicates one of a coinciding block and a non-coinciding block between the reference map and the comparative map, per each respective the plurality of blocks thereof, upon the reference map and the comparative map being compared in a comparison operation per each respective the plurality of blocks thereof; is configured to obtain a synthesized image of the plurality of images; and is configured to replace at least a part of the synthesized image with a corresponding part of the reference image based on the change-detection map.

In an embodiment, an image-processing method is provided, including setting one image of a plurality of images, which have been sequentially imaged, as a reference image and setting each remaining image of the plurality of images as a comparative image; generating a reference map by dividing the reference image into a plurality of blocks; generating a comparative map for each the comparative image by dividing each the comparative image into a plurality of blocks; generating a change-detection map which indicates one of a coinciding block and a non-coinciding block between the reference map and the comparative map, per each respective the plurality of blocks, by performing a comparison operation between the reference map and the comparative map per each respective the plurality of blocks thereof; obtaining a synthesized image by synthesizing the plurality of images; and replacing at least part of the synthesized image with a corresponding part of the reference image based on the change-detection map.

In an embodiment, a program is provided, to be implemented by a computer, the program including setting one image of a plurality of images, which have been sequentially imaged, as a reference image and setting each remaining image of the plurality of images as a comparative image; generating a reference map by dividing the reference image into a plurality of blocks; generating a comparative map for each the comparative image by dividing each the comparative image into a plurality of blocks; generating a change-detection map which indicates one of a coinciding block and a non-coinciding block between the reference map and the comparative map, per each respective the plurality of blocks, by performing a comparison operation between the reference map and the comparative map per each respective the plurality of blocks thereof; obtaining a synthesized image by synthesizing the plurality of images; and replacing at least part of the synthesized image with a corresponding part of the reference image based on the change-detection map.

According to the present invention, a photographing apparatus, a photographing method, an image processor, an image-processing method, and a program can be achieved which can favorably carry out multi-shot synthesizing by synthesizing a plurality of sequentially photographed images to obtain a synthesized image.

The present disclosure relates to subject matter contained in Japanese Patent Application No. 2015-101685 (filed on May 19, 2015) which is expressly incorporated herein in its entirety.

BRIEF DESCRIPTION OF THE DRAWINGS

The present invention will be discussed below in detail with reference to the accompanying drawings, in which:

FIGS. 4A, 4B, 4C and 4D are conceptual diagrams of an example of an "PSR photographing mode (multi-shot mode)" of the illustrated embodiment;

FIG. 14 shows an example of a failed attempt of multi-shot synthesis.

DESCRIPTION OF THE EMBODIMENTS

A digital camera (photographing apparatus) 10 of the illustrated embodiment will be herein discussed with reference to FIGS. 1 through 13.

Figure 1:
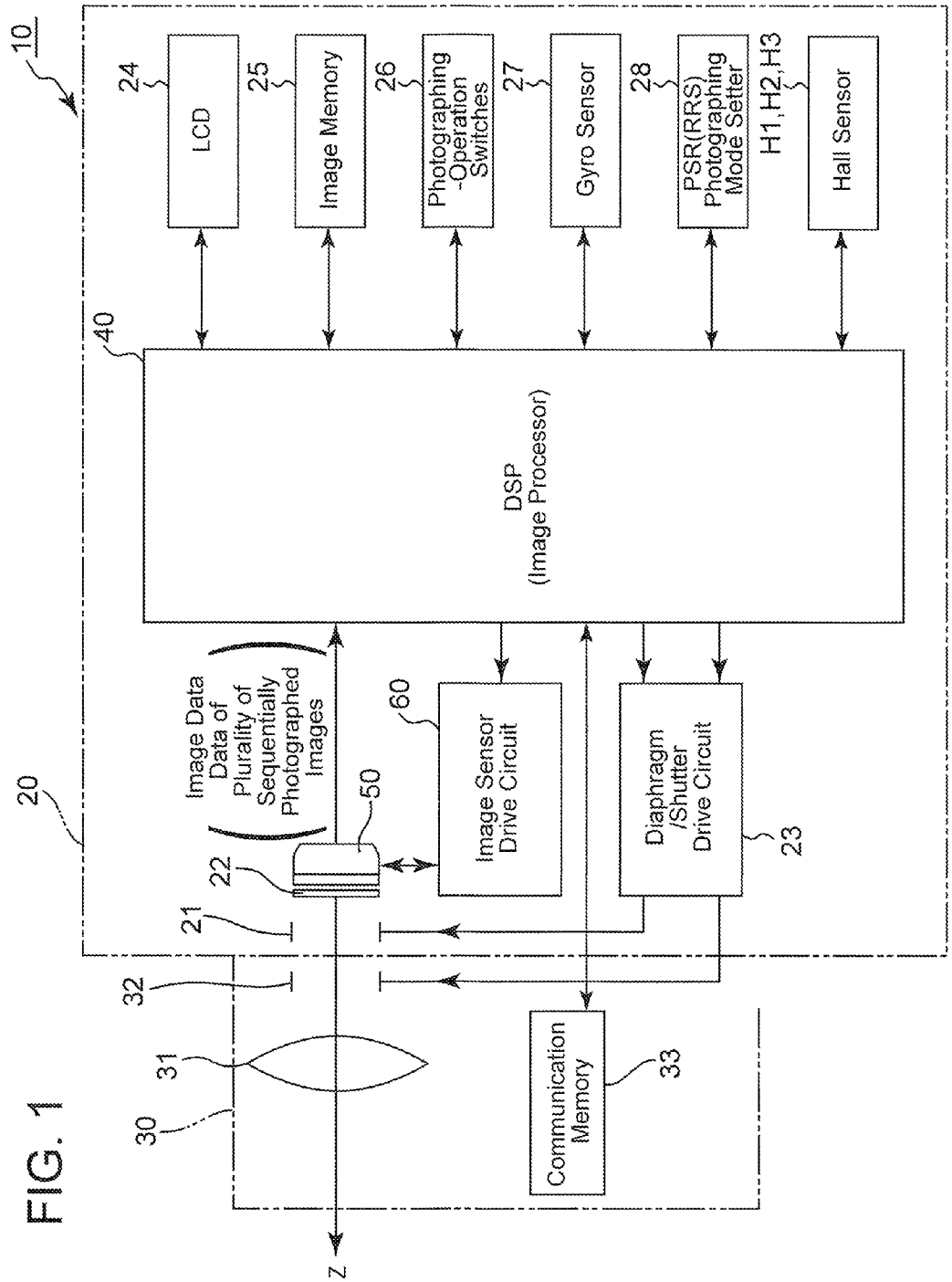
FIG. 1 is a block diagram indicating the main components of a digital camera (photographing apparatus) of an embodiment according to the present invention.

As shown in FIG. 1, the digital camera 10 is provided with a camera body 20, and a photographing lens 30 (an interchangeable photographing lens) which is detachably attached to the camera body 20. The photographing lens 30 is provided with a photographing lens group (part of a photographing optical system/movable member/image-shake correction member) 31, and a diaphragm (part of the photographing optical system) 32, in that order from the object side (left side of FIG. 1) to the image side (right side of FIG. 1). The camera body 20 is provided with a shutter (part of the photographing optical system) 21, and an image sensor (movable member/image-shake correction member) 22, in that order from the object side (left side of FIG. 1) to the image side (right side of FIG. 1). Furthermore, the camera body 20 is provided with a diaphragm/shutter drive circuit 23 which controls the driving of the diaphragm 32 and the shutter 21 when the photographing lens 30 is attached to the camera body 20. An object image, which is formed by object-emanating light rays that are incident on the photographing lens group 31 and pass through the diaphragm 32 and the shutter 21, is formed on a light-receiving surface of the image sensor 22. The object image which is formed on the light-receiving surface of the image sensor 22 is electrically converted into pixel signals via a large number of pixels, arranged in a matrix, having different detection colors, and is output as image data (plurality of sequentially photographed image data) to a DSP (Digital Signal Processor/image processor) 40. The DSP 40 performs predetermined image processing on image data that has been input therein from the image sensor 22; and this processed image data is displayed on an LCD 24 and is stored in an image memory 25. Furthermore, although the photographing lens group 31 is indicated in FIG. 1 as a single lens element, in practice the photographing lens group 31 includes a plurality of lens elements such as, e.g., a fixed lens element(s), lens elements of a zoom lens system which move during zooming, and/or a focusing lens element (s) which moves during focusing, etc.

Although not shown in the drawings, the image sensor 22 is configured of a plurality of components, such as a package, a solid-state imaging device chip accommodated in the package, and a lid member fixed onto the package in order to protect the solid-state imaging device chip in an air-tight manner. In the present disclosure, "driving the image sensor 22" refers to "driving at least a part of the plurality of components of the image sensor 22 through which the object-emanating light rays pass".

The photographing lens 30 is provided with a communication memory 33 which stores various information, such as resolution (MTF) information of the photographing lens group 31 and the aperture diameter (aperture value) of the diaphragm 32, etc. Upon the photographing lens 30 being attached to the camera body 20, various information stored in the communication memory 33 is read into the DSP 40.

The camera body 20 is provided with photographing-operation switches 26 which are connected to the DSP 40. The photographing-operation switches 26 include various switches, such as a power-ON switch and a shutter-release switch, etc.

The camera body 20 is further provided with a gyro sensor (shake detector) 27 which is connected to the DSP 40. The gyro sensor 27 detects shake detection signals that indicate shaking in a plane that is orthogonal to the optical axis (the optical axis that is defined by the photographing lens group 31) within the camera body 20 by detecting the angular velocity of the movement that is applied to the camera body 20 (about an x-axis and a y-axis).

Figure 2:
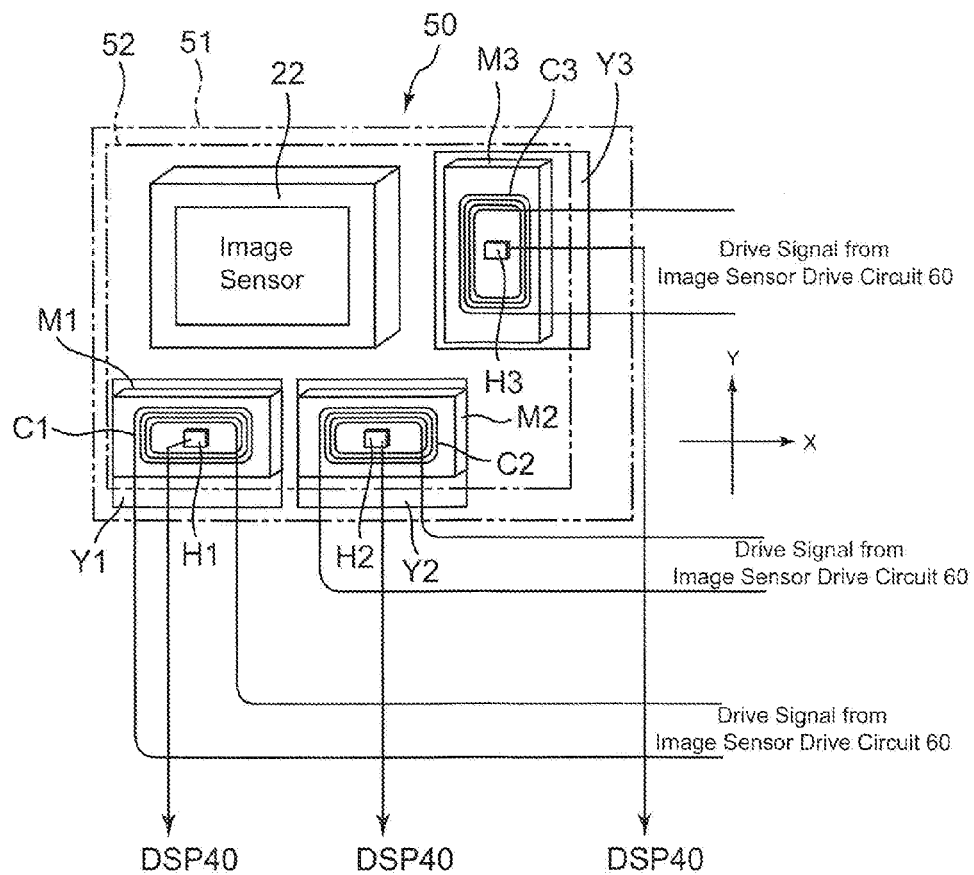
FIG. 2 is a block diagram indicating the main components of an image-shake correction device (image stabilizer)
Figure 3:
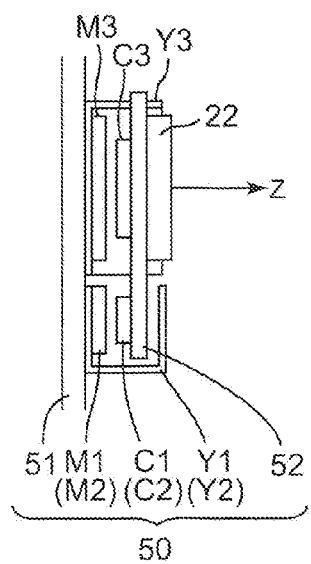
FIG. 3 is a side elevational view showing an arrangement of the image-shake correction device.

As shown in FIGS. 1 through 3, the image sensor 22 is mounted onto an image-shake correction device (image stabilizer) 50 so that the image sensor 22 is movable in an x-direction and a y-direction (two orthogonal directions), which are orthogonal to an optical axis Z of the photographing optical system (photographing lens group 31). The image-shake correction device 50 is provided with a mount support plate 51 which is mounted onto a structural member such as a chassis, etc., of the camera body 20; a movable stage 52, onto which the image sensor 22 is mounted, which is slidable relative to the mount support plate 51; magnets M1, M2 and M3 mounted onto the mount support plate 51 on the side thereof that faces the movable stage 52; yokes Y1, Y2 and Y3 which are made of a magnetic material and are mounted onto the mount support plate 51 to face the magnets M1, M2 and M3 with the movable stage 52 positioned between the magnets M1, M2 and M3 and the yokes Y1, Y2 and Y3, thereby forming a magnetic circuit between the yokes Y1, Y2 and Y3 and the magnets M1, M2 and M3, respectively; and drive coils C1, C2 and C3, mounted onto the movable stage 52, which each generate a driving force by receiving an electric current within the magnetic field of the magnetic circuit. The movable stage 52 (image sensor 22) is driven (moved) relative to the mount support plate 51 within a plane that is orthogonal to the optical axis by supplying (applying) alternating drive signals (alternating current) to the drive coils C1, C2 and C3. The alternating drive signals that are supplied to the drive coils C1, C2 and C3 are controlled by the DSP 40 and are generated by an image sensor drive circuit 60.

In the illustrated embodiment, a magnetic driver configured of the magnet M1, the yoke Y1 and the drive coil C1, and a magnetic driver configured of the magnet M2, the yoke Y2 and the drive coil C2 (two magnetic drivers) are arranged along a long-side direction (horizontal direction/x-direction) of the image sensor 22 at a predetermined distance therebetween; and a magnetic driver configured of the magnet M3, the yoke Y3 and the drive coil C3 (one magnetic driver) is arranged along a short-side direction of the image sensor 22 orthogonal to the long-side direction thereof (vertical direction/y-direction).

The mount support plate 51 is further provided with Hall sensors (position detectors) H1, H2 and H3 arranged in the close vicinity of the drive coils C1, C2 and C3, respectively (within the central spaces thereof). The Hall sensors H1, H2 and H3 detect the magnetic force of the magnets M1, M2 and M3 and output (detect) Hall output signals (position detection signals), which indicate the position of the movable stage 52 (image sensor 22) in a plane that is orthogonal to the optical axis Z. The y-directional position and inclination (rotation) of the movable stage 52 (image sensor 22) are detected by the Hall sensors H1 and H2, and the x-directional position of the movable stage 52 (image sensor 22) is detected by the Hall sensor H3. The DSP 40 controls, via the image sensor drive circuit 60, the driving of the image-shake correction device 50, which moves the image sensor 22 within a plane orthogonal to the optical axis Z, based on shake detection signals detected by the gyro sensor 27 that indicate hand shake/vibrations applied to the camera body 20 in a plane orthogonal to the optical axis Z, and the Hall output signals that indicate the position of the image sensor 22 within a plane orthogonal to the optical axis Z output by the Hall sensors H1, H2 and H3. Accordingly, the imaging position of the object image on the image sensor 22 can be displaced to correct image shake that is caused by hand shake/vibrations, etc.

The digital camera 10 of the illustrated embodiment is provided with a photographing mode (multi-shot mode) which sequentially takes a plurality of pictures (images)

while utilizing the image-shake correction device 50 to minutely move the image sensor 22 in a plane that is orthogonal to the optical axis Z of the photographing optical system (photographing lens group 31), and synthesizes these images into a single picture (synthesized not by simple addition of the images, but by synthesizing using specific arithmetic operations via image processing of data), thereby generating an ultra-high definition (high picture quality and high precision) image; hereinafter, this photographing mode will be referred to as a "PSR (Pixel Shift Resolution) photographing mode" (Pixel Shift Resolution is also known as "RRS (Real Resolution System)". Unlike a conventional Bayer method that obtains one piece of color information per one pixel, the "PSR photographing mode (multi-shot mode)" obtains information of each RGB color for each pixel, thereby enabling an extremely high definition image to be created that has superior detail and color reproduction. Furthermore, an effect can be obtained in which high sensitivity noise can be reduced without the occurrence of moiré or false color.

FIGS. 4A through 4D are conceptual diagrams of an example of an "PSR photographing mode (multi-shot mode)" of the illustrated embodiment. In each of FIGS. 4A through 4D, the image sensor 22 is provided with a large number of pixels arranged at a predetermined pixel pitch as a matrix on the light-receiving surface of the image sensor 22, and one of Bayer array color filters R, G (Gr, Gb) and B is provided in front surface of each pixel. The pixels detect the color of the object-emanating light rays that are incident thereon, i.e., photoelectrically convert the light of the color components (color band), via the respective color filters R, G (Gr, Gb) and B (which are provided on the front surface of the pixels), and each pixel stores an electrical charge in accordance with the strength (luminance) of the light rays. More specifically, an image is photographed at the reference position shown in FIG. 4A; another image is photographed at the position shown at FIG. 4B, at which the image sensor 22 has been moved downward by a pitch of one pixel; another image is photographed at the position shown at FIG. 4C, at which the image sensor 22 has been further moved rightward by a pitch of one pixel; another image is photographed at the position shown at FIG. 4D, at which the image sensor 22 has been further moved upward by a pitch of one pixel; and thereafter the image sensor 22 returns to the reference position shown in FIG. 4A. Hence, four images that are sequentially photographed by driving the image sensor 22, in a square movement path at a pitch of one pixel in a plane that is orthogonal to the optical axis, are input into the DSP 40 as raw image data (raw format data).

As shown in FIG. 1, the camera body 20 is provided with an PSR photographing mode setter (RRS photographing mode setter) 28, connected to the DSP 40, for determining whether or not to carry out the "PSR photographing mode" and also for performing detailed settings.

In the "PSR photographing mode (multi-shot mode)", the DSP 40 of the illustrated embodiment performs a special control in order to attain a high quality image, in which even if significant changes in the photographing conditions have occurred during the sequential photographing of a plurality of images, any adverse influence of such changes has been reduced to the utmost limit (as much as possible). Hereinbelow, we will discuss the details of the configuration and operation of the above-mentioned special control by referring to an example in which an PSR photographing process (multi-shot synthesis) is performed with the digital camera 10 of the illustrated embodiment on the same object as that in the failed attempt of multi-shot synthesis that is shown in FIG. 14 (in which a bird (obstacle) has traversed the picture from the right side to the left side).

Figure 5:
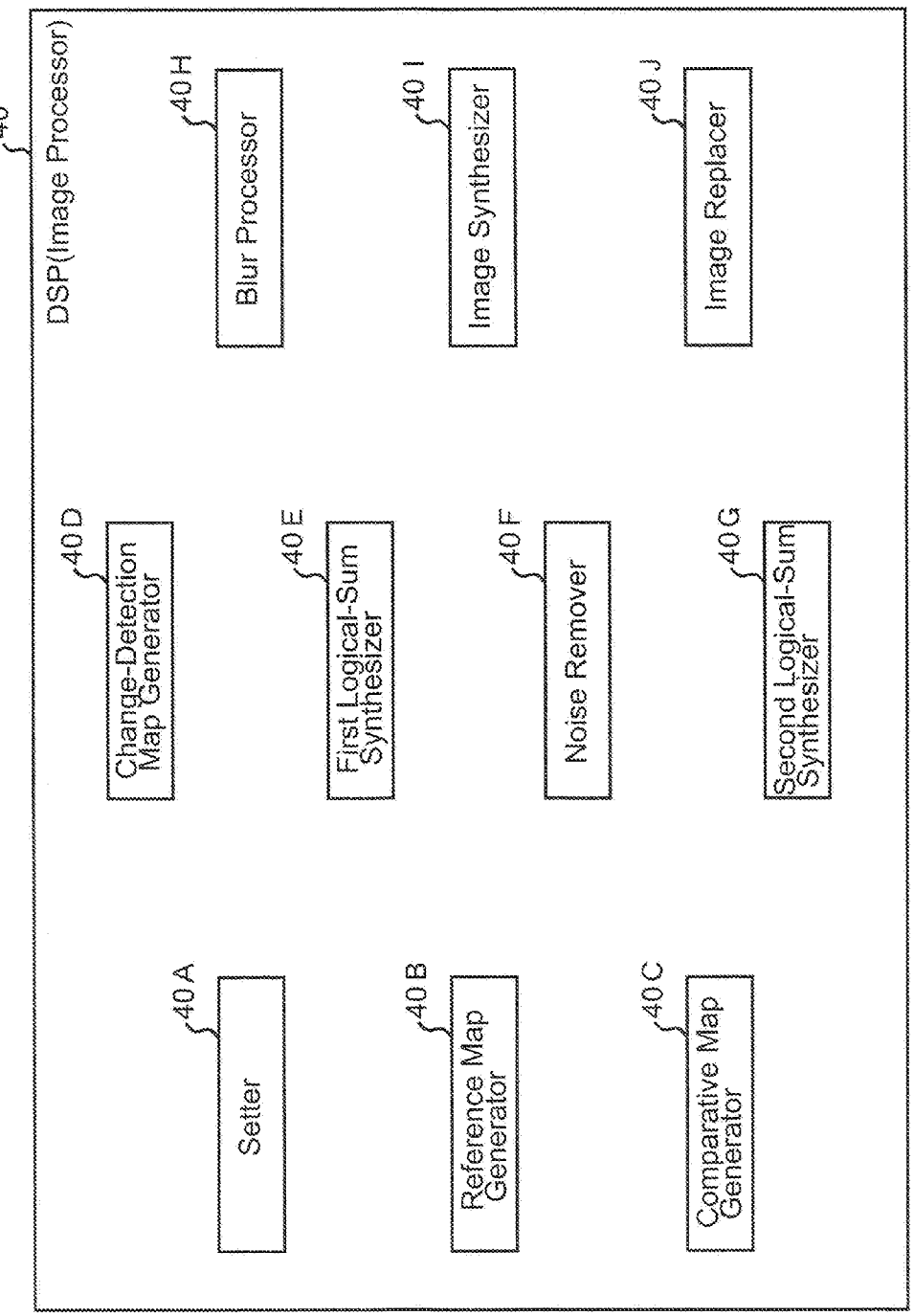
FIG. 5 is a functional block diagram showing the internal configuration of a DSP (image processor)

FIG. 5 is a functional block diagram showing the internal configuration of the DSP 40. The DSP 40 is provided with a setter (image processor) 40A, a reference map generator (image processor) 40B, a comparative map generator (image processor) 40C, a change-detection map generator (replacement map generator/image processor) 40D, a first logical-sum synthesizer (image processor) 40E, a noise remover (image processor) 40F, a second logical-sum synthesizer (image processor) 40G, a blur processor (image processor) 40H, an image synthesizer (image processor) 40I, and an image replacer (image processor) 40J.

Figure 6:
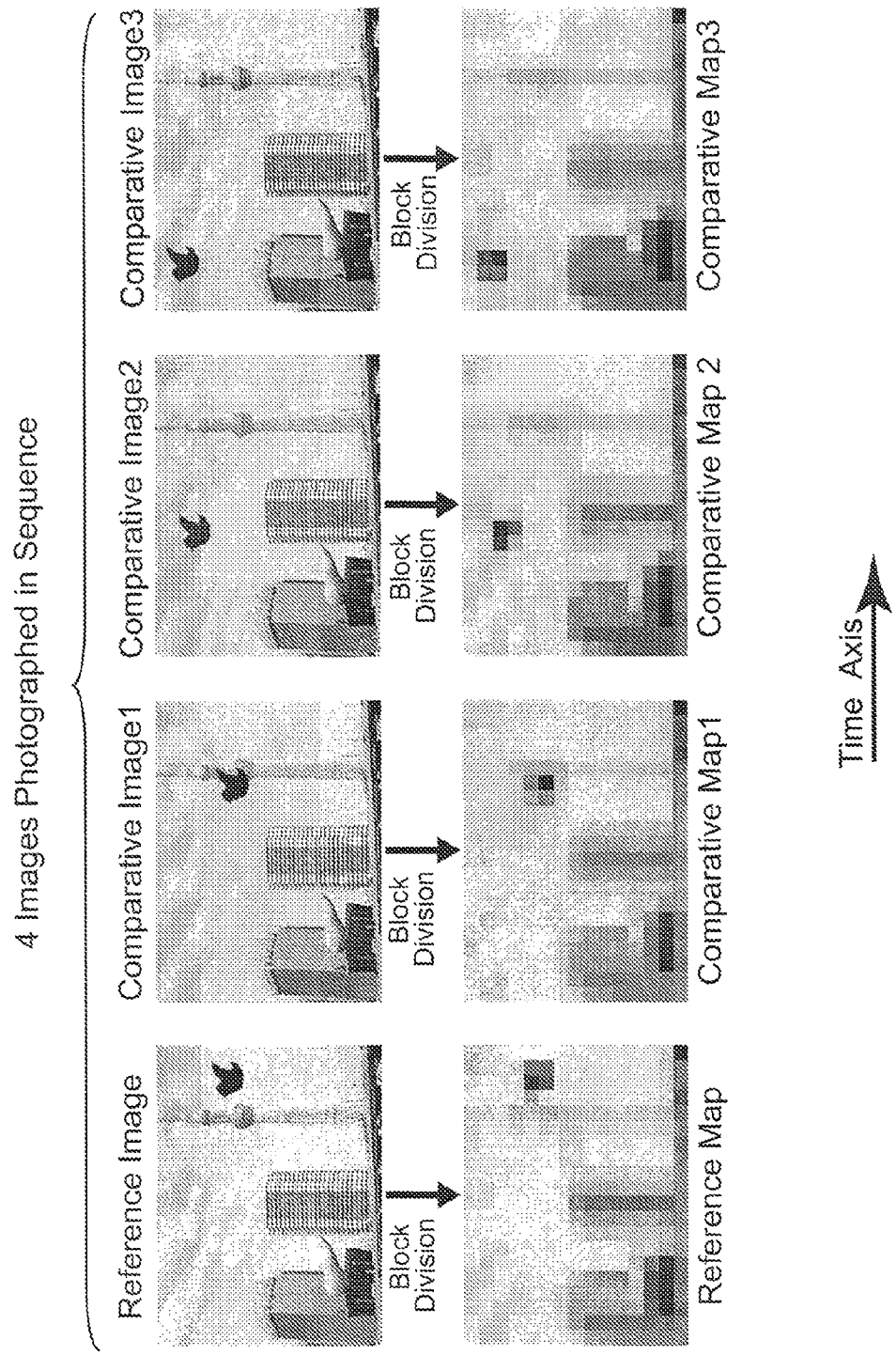
FIG. 6 shows a reference map being generated by dividing a reference image into blocks, and comparative maps being generated by dividing comparative images into blocks.

The setter 40A sets one image of the four images, which were sequentially photographed (imaged) by the image sensor 22, as a reference image, and the remaining (three) images are set as comparative images. At this stage, as shown in FIG. 6, the setter 40A sets the first image that the image sensor 22 photographed as a "reference image", sets the second image that the image sensor 22 photographed as a "comparative image 1", sets the third image that the image sensor 22 photographed as a "comparative image 2", and sets the fourth image that the image sensor 22 photographed as a "comparative image 3". It should be noted that the setter 40A does not necessarily need to set the first image that the image sensor 22 photographed as a "reference image", but rather can set, for example, the fourth image that the image sensor 22 photographed as a "reference image".

The reference map generator 40B generates a "reference map" by dividing the reference image, set by the setter 40A, into blocks.

The comparative map generator 40C generates a "comparative map 1", a "comparative map 2" and a "comparative map 3" by dividing the comparative image 1, the comparative image 2 and the comparative image 3, which were set by the setter 40A, into blocks, respectively.

FIG. 6 shows the reference image, the comparative image 1, the comparative image 2 and the comparative image 3 upon being block-divided into the reference map, the comparative map 1, the comparative map 2 and the comparative map 3, respectively. Although there is a certain degree of freedom with regard to the size and shape of the divided blocks, the images can be divided into, e.g., 16 by 16 squares. In such a case, even if the RGB colors of the color filters of the image sensor 22 are provided separately from each other, the data amount can be reduced by up to $3/256$. It is desirable for the size and shape of the block divisions that are used for the reference map, which is converted from the reference image, to be the same as those used for the comparative maps, which are converted from the comparative images, respectively.

The change-detection map generator 40D generates a change-detection map (replacement map) which indicates in block units where the reference map and the comparative maps coincide and where the reference map and the comparative maps do not coincide, by performing a comparison operation between the reference map and the comparative maps in block units.

Figure 7:
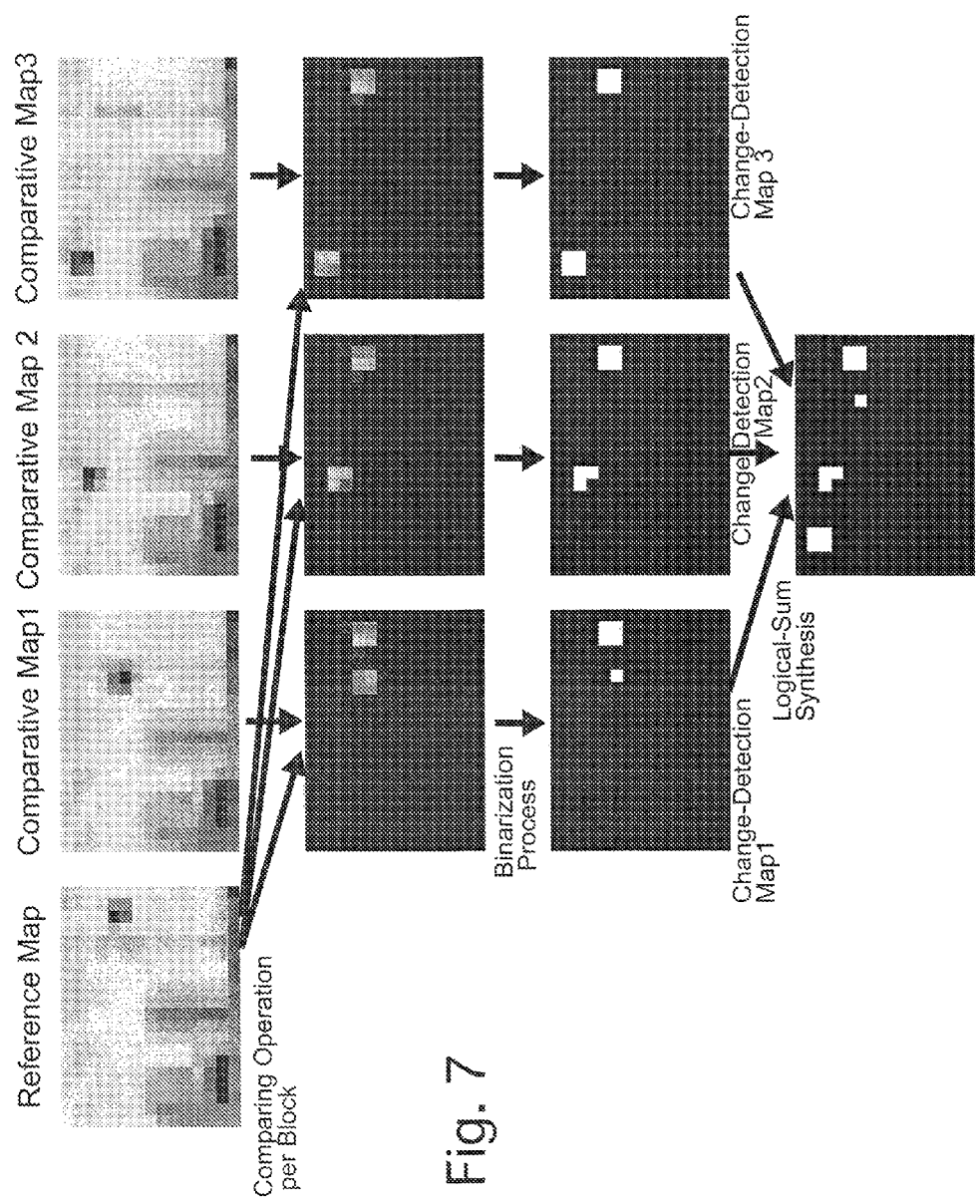
FIG. 7 shows a plurality of change-detection maps which are generated by an operation that compares a reference map with a plurality of comparative maps, and shows the logical-sum synthesis of the change-detection maps.

More specifically, as shown in FIG. 7, the change-detection map generator 40D generates a "change-detection map 1" by performing a comparison operation between the reference map and comparative map 1, generates a "change-detection map 2" by performing a comparison operation between the reference map and comparative map 2, and generates a "change-detection map 3" by performing a comparison operation between the reference map and comparative map 3.

There is a certain degree of freedom with regard to the configuration of the comparison operation that is performed by the change-detection map generator 40D, however, since it is unlikely that the characteristic amounts of corresponding divided blocks would perfectly coincide, determining whether corresponding dividing blocks coincide or not can be carried out by a difference amount in the case of average values being used, or by whether a specific threshold value of a degree of similarity has been exceeded in the case of a histogram being used. In the example shown in FIG. 7, a difference amount is calculated with respect to averaged luminance information between corresponding divided blocks; if this difference amount is less than a predetermined amount, the corresponding block is indicated in black, and if this difference is greater than or equal to the predetermined amount, the corresponding block is indicated in white as a non-coinciding block. In other words, the coinciding and non-coinciding of corresponding divided blocks are ultimately binarized into black blocks (coinciding blocks) and white blocks (non-coinciding blocks).

The first logical-sum synthesizer 40E logical-sum synthesizes change-detection map 1, change-detection map 2 and change-detection map 3, with, for example, the non-coincident blocks being designated as TRUE. The last stage at the bottom of FIG. 7 shows a change-detection map that was logical-sum synthesized by the first logical-sum synthesizer 40E.

Hence, if a change in the object occurs in the reference image (reference map) or in any of the comparative images (comparative maps), an error pattern is generated. Accordingly, the comparison (arithmetic operation) is performed at least between the reference image (reference map) and at least one comparative image (comparative map). In other words, the reference image (reference map) does not necessarily need to be compared (via a comparative arithmetic operation) with each of the comparative image 1 (comparative map 1), the comparative image 2 (comparative map 2) and the comparative image 3 (comparative map 3).

In order to detect an occurrence of a change in the object, it is determined whether or not the color information at the same location (block) coincide with each other (whether or not the color information is substantially the same). However, since the pixels of each shot (photographed image) other than G-components obtain different positions and color information, it is not practical to perform calculations per unit of pixel. Since a pattern that occurs due to a change in the object is not prominent unless such a pattern has been established (with a minimum of at least four pixels) to a certain extent, as shown in FIGS. 6 and 7, each image is divided into blocks, and the change in the object (the degree of coincidence of the color information) is determined by a comparative operation by comparing the characteristic amounts of corresponding blocks. By configuring each block to have a size of an even number of vertical and horizontal pixels, the number of each RGB component is the same for each block; hence, since substantially the same area is picked up at the same block position, the relative difference therebetween (between the plurality of images) is reduced. By collecting the color information per block and carrying out the detection changes at the block level, the amount of calculation that is required can be significantly reduced. Whereas, if comparison operation (detection of changes) were to be carried out per pixel, the number of comparisons would increase, which would cause the processing time to be longer, as well as false detections (due to noise) easily occurring. By collecting the signal values of the pixels as characteristic amounts per block, the influence of noise can be reduced, and if noise removal is required, such noise removal can be simplified. Furthermore, as discussed hereinbelow, since the amount of calculations is significantly reduced compared to performing calculations per pixel, if the same calculations are performed for a plurality of conditions, this reduction in amount of calculations translates to a reduction in the overall processing time. Accordingly, it becomes possible for the processing time to be dropped down to a practical level for processes performed in a camera. Furthermore, if a change in the object were not to occur, since the detection process would not detect any changes, an image with the synthesis information remained at every area (block) thereof would be generated even if a replacement process (discussed hereinbelow) were to be performed. Accordingly, there is no need to intentionally turn OFF the "PSR photographing mode (multi-shot mode)".

Figure 8:
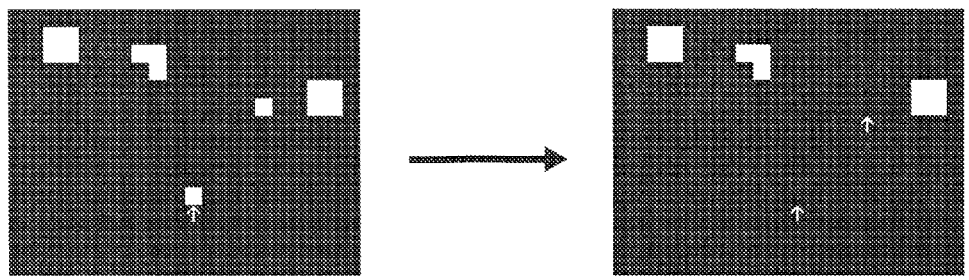
FIG. 8 shows a noise removal process which is carried out by a noise remover.

The noise remover 40F removes noise from the change-detection map that was logical-sum synthesized by the first logical-sum synthesizer 40E. FIG. 8 shows a noise removal process which is carried out by the noise remover 40F. A controller (not shown) controls whether or not a noise removal process is performed by the noise remover 40F and controls the sensitivity thereof.

The change-detection map generator 40D generates a plurality of loops of change-detection maps by performing a comparison operation between the reference map and the comparative maps for a plurality of loops while changing the configuration (conditions for calculating the characteristic amounts and for the comparison operation) of the comparison operation including whether or not a noise removal process is performed by the noise remover 40F and controls the sensitivity.

Figure 9:
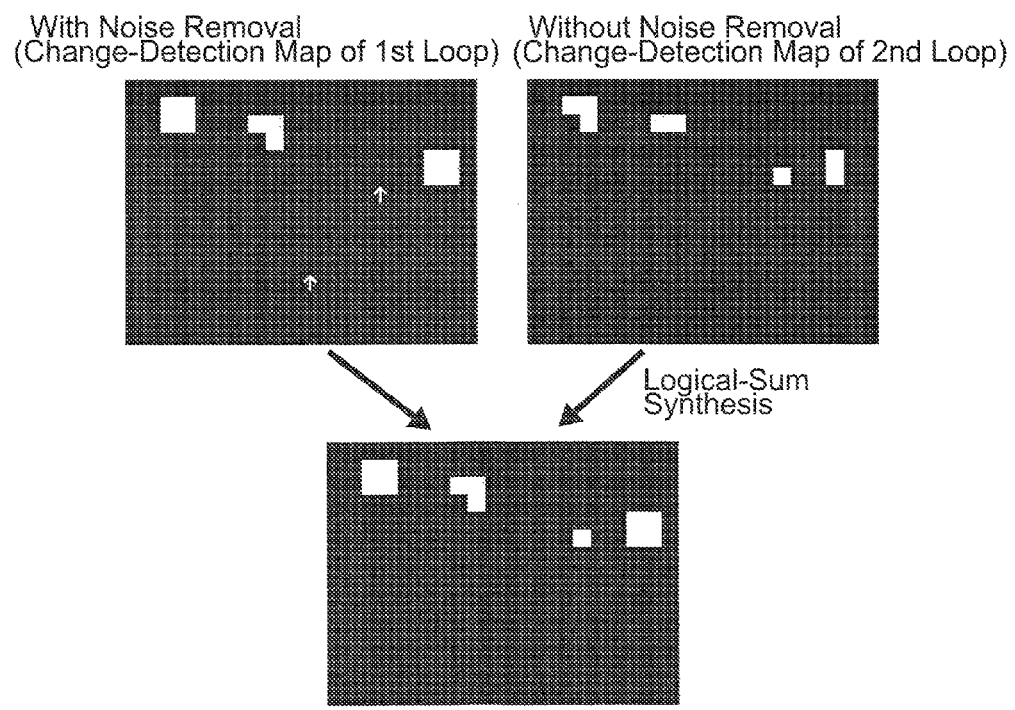
FIG. 9 shows a process of the logical-sum synthesis of a plurality of loops of change-detection maps which is carried out by a second logical-sum synthesizer.

The second logical-sum synthesizer 40G logical-sum synthesizes a plurality of loops of change-detection maps that are generated by the change-detection map generator 40D. FIG. 9 shows the logical-sum synthesis of the plurality of loops of change-detection maps that is performed by the second logical-sum synthesizer 40G. In the example shown in FIG. 9, the second logical-sum synthesizer 40G has logical-sum synthesized a first loop of a change-detection map, to which the noise removal process was carried out as a result of noise detection being attempted at high-sensitivity conditions, with a second loop of a change-detection map, to which the noise removal process was nor carried out as a result of noise detection being attempted at low-sensitivity conditions.

Sometimes, depending on the conditions for determining a change in the object, a false detection of a change in the object can occur even though a change in the object has not actually occurred. For example, if some of the blocks are generally dark while strong light rays exist at a border between such blocks, sometimes the average brightness value changes by a large amount due to the minute movement of a pixel shift process, thereby erroneously detecting a change in the object. Furthermore, sometimes a false detection occurs when a difference in characteristic amounts increases due to noise caused by the image sensor. In order to resolve these problems, an additional noise removal process, etc., is carried out on the result of the comparison (the change-detection map or the logical-sum synthesized change-detection map). Furthermore, a plurality of block comparison conditions can be provided, and a plurality of change-detection maps that show where errors occurred under each block comparison condition, respectively, are generated; subsequently, a final result (the change-detection map that is obtained by the second logical-sum synthesizer 40G via logical-sum synthesis) is obtained by combining these change-detection maps.

For example, regarding RGB information that has been averaged between adjacent blocks, a value A which designates the greatest characteristic amount of the adjacent blocks, and a value D which designates a value (0 if less than 0) from which a constant b, for removing a noise component from a difference value, is subtracted are obtained, and it is assumed that if the square sum of D exceeds the square sum of A multiplied by 1/r (if $D^2>A^2*1/r$), the adjacent blocks do not substantially coincide in characteristic amount. In this example, the smaller the value of b or 1/r, the greater the noise removal sensitivity and the greater the rate of false detection; conversely, the greater the value of b or 1/r, the smaller the noise removal sensitivity and the smaller the rate of false detection.

If the conditions are set to a sensitive level, as shown in FIG. 8, the probability of noise mixing in with the result (the change-detection map) increases. If, in order to remove such noise, a process is performed that only leaves groups of adjacent blocks, sometimes a block(s) that was correctly detected as (part of) the object is deleted. Hence, as shown in FIG. 9, the result (the change-detection map), to which the conditions therefor are set so that only genuine changes in characteristic amounts are detected so that negligible noise is ignored (removed) as much as possible, is calculated separately; hence, since a false detection does not easily occur, a noise removal process is not carried out. Accordingly, if the amount of change within a block is large even if the area is small, such a change will remain in the result (the change-detection map). By combining the result of FIG. 8 with the result of FIG. 9, a functional effect can be obtained in which almost none of the correct detection areas are erroneously deleted while successfully removing noise.

The optimum conditions for detection changes according to the system used and the photographing conditions. Therefore, the comparison method and coefficients such as the aforementioned value 'b' and 'r' can be arbitrarily changed in accordance with the system used and the photographing conditions; which refers to the change-detection map generator 40D generating a plurality of loops of change-detection maps by a comparison operation between the reference map and the comparative maps for each of the plurality of loops.

Furthermore, by adding a result from a characteristic amount that is obtained upon a shift in position by half a block to parameters used for determining whether a change has occurred, a more appropriate result (change-detection map) can be obtained even if strong light exists at the aforementioned border between adjacent blocks. In this case, the overall amount of calculation can be reduced by first dividing each adjacent block into sub-blocks having a half vertical and horizontal size, calculating the characteristic amount of each sub-block, and averaging out the characteristic amounts for the 2 by 2 sub-blocks.

Figure 10:
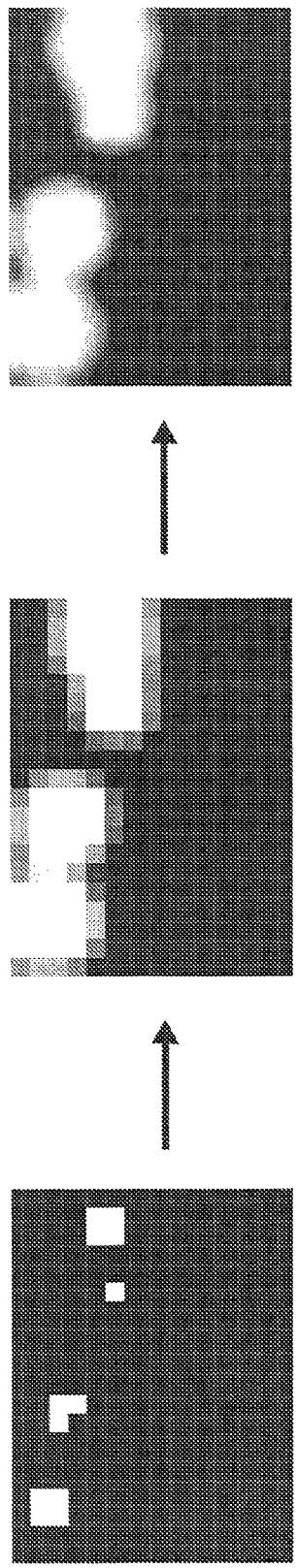
FIG. 10 shows a blur process which is carried out by a blur processor.

The blur processor 40H performs a blurring process at the borders between coinciding blocks and non-coinciding blocks of the change-detection map. FIG. 10 shows the blurring process that is applied by the blur processor 40H. In the illustrated embodiment, since the coinciding and the non-coinciding of the corresponding divided blocks are determined by '1' or '0', the blurring process is applied at a radius of 1 through 2 blocks, with non-coinciding blocks designated as 100% and coinciding blocks designated as 0%. The blurring process can be applied at a desired stage of a plurality of stages of synthesizing of a plurality of comparison-operation results; however, a certain amount of freedom is allowed in regard to which stage to apply the blurring process (various design changes are possible). The blurring process shown in FIG. 10 is performed while enlarging the blurring-process application area, and upon the completion of the blurring process, the blurring-process application area has enlarged to the extent of completely covering (the size of) the original images of the non-coinciding blocks. During this blurring process, the borders can be gently smoothed out by applying a compensation process.

Figure 11:
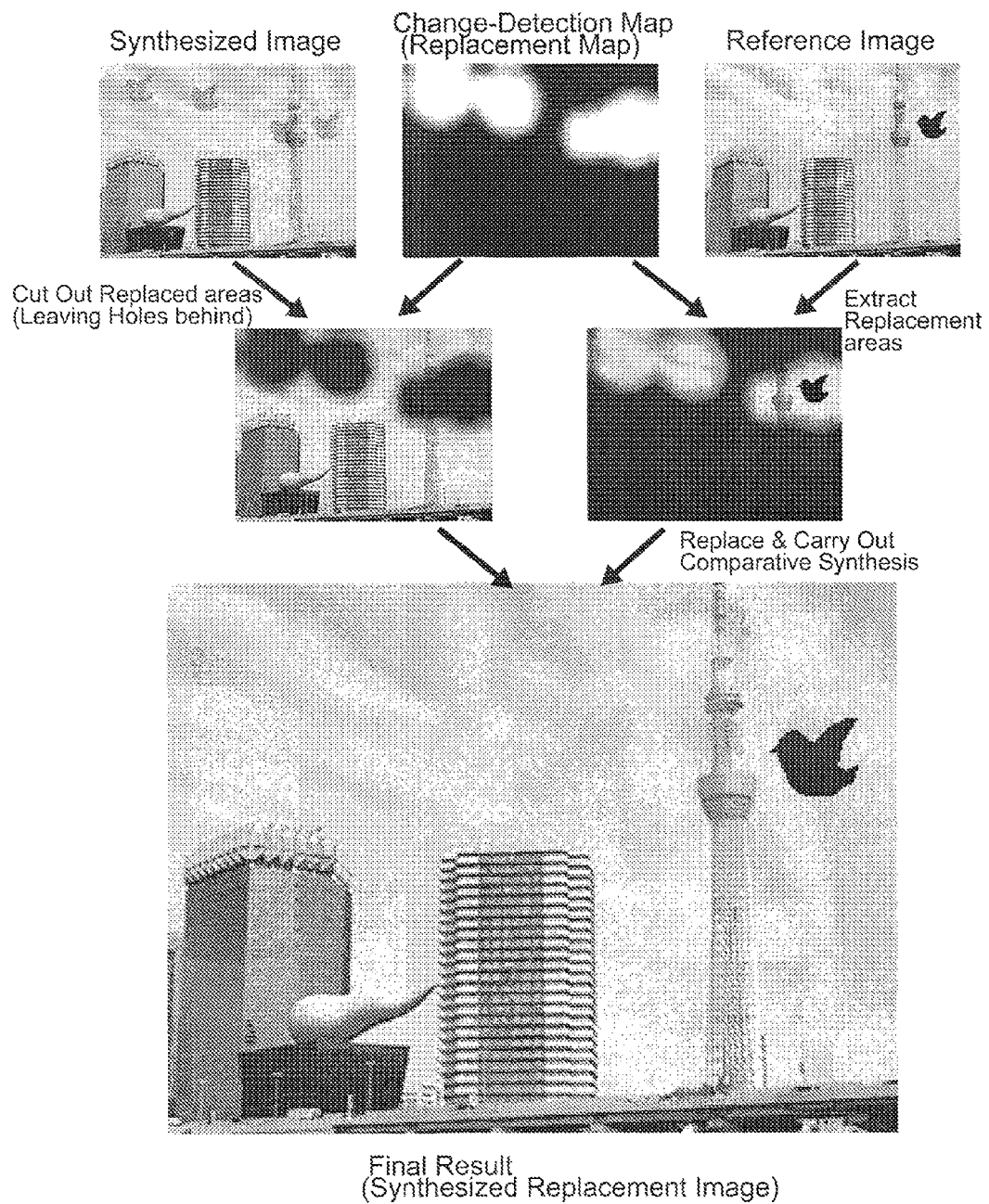
FIG. 11 shows a synthesized-image replacement process which is carried out by an image replacer.

The image synthesizer 40I synthesizes the four images that were sequentially photographed by the image sensor 22 to obtain a synthesized image. As shown in FIG. 11, this synthesized image (of the illustrated embodiment) is an unsuccessful example of the corresponding failed example of a synthesized image in which a net pattern is generated along the path where a bird (obstacle) has traversed the picture during a sequential photography of four images.

The image replacer 40J replaces at least a part of the synthesized image obtained by the image synthesizer 40I with the reference image in accordance with the change-detection map (replacement map). As shown in FIG. 11, the image replacer 40J cuts out (leaving holes behind) parts, as "areas to be replaced", corresponding to the non-coinciding blocks and the border areas of the non-coinciding blocks of the change-detection map (the white areas shown in the change-detection map in FIG. 11) from out of the synthesized image. Furthermore, the image replacer 40J extracts parts, as "replacing areas", corresponding to the non-coinciding blocks and the border areas of the non-coinciding blocks of the change-detection map (the white areas shown in the change-detection map in FIG. 11) from out of the reference image. Subsequently, the image replacer 40J performs a replacing process by plugging the "replacing areas" that were extracted from the reference image into the "areas to be replaced" that were cutout from the synthesized image. During this replacing process, the image replacer 40J carries out a replacement synthesizing process at ratios of 0% and 100% for the parts that correspond to the non-coinciding blocks (the square block portions at the center of the parts) of the change-detection map, and the image replacer 40J carries out a replacement synthesizing process together with a weight-summing process in accordance with the synthesizing ratio (not 0% or 100%) on the border areas of the non-coinciding blocks of the change-detection map (the portions to which burring and or a compensation process have been carried out).

In the final result (synthesized replacement image) that has been obtained by the above-described processes, the four net patterns that were generated along the path where a bird (obstacle) has traversed have been completely removed, and the bird is positioned (imaged) at the same place as that of the first photographed image (reference image) that was imaged by the image sensor 22. Moreover, the parts of the final result (synthesized replacement image) to which the synthesized-image replacing process was not carried out by the image replacer 40J has extremely ultra-high definition (high picture quality and high precision), having superior detail and color reproduction, and high sensitivity noise is reduced without the occurrence of moiré or false color.

An RSS photographing process (RSS photographing mode) that is carried out by the digital camera 10 of the illustrated embodiment will thereinafter be discussed with reference to the flowchart of FIG. 12. The RSS photographing process is achieved by running a predetermined program in a microprocessor (computer) of the DSP 40.

In step S1 and step S2, a specified number (N) of still images are taken (imaged) by the image sensor 22 while driving (moving) the image sensor 22 in a plane that is orthogonal to the optical axis. The specified number (N) of still images refers to the "plurality of sequentially photographed images".

In step S3, an "object-change (moving object) detection process" is performed on the specified number (N) of still images (plurality of sequentially photographed images). Details of this "object-change (moving object) detection process" will be discussed later while referring to the subroutine flow chart of FIG. 13.

In step S4, the specified number (N) of still images (plurality of sequentially photographed images) are synthesized and converted into a synthesized image (convert N-shots of images to synthesized image).

In step S5, "replacing areas" for replacing parts of the synthesized image are extracted from the reference image (reference shot compensation image conversion) in accordance with the result of the "object-change (moving object) detection process" of step S3.

In step S6, a replacement process (object-change replacement process) is performed by plugging the "replacing areas" that were extracted from the reference image into the "areas to be replaced" that were cut out from the synthesized image in accordance with the result of the "object-change (moving object) detection process" of step S3.

In step S7, a final image (synthesized replacement image) obtained by the replacement process, i.e., the PSR photographing image is output.

Figure 12:
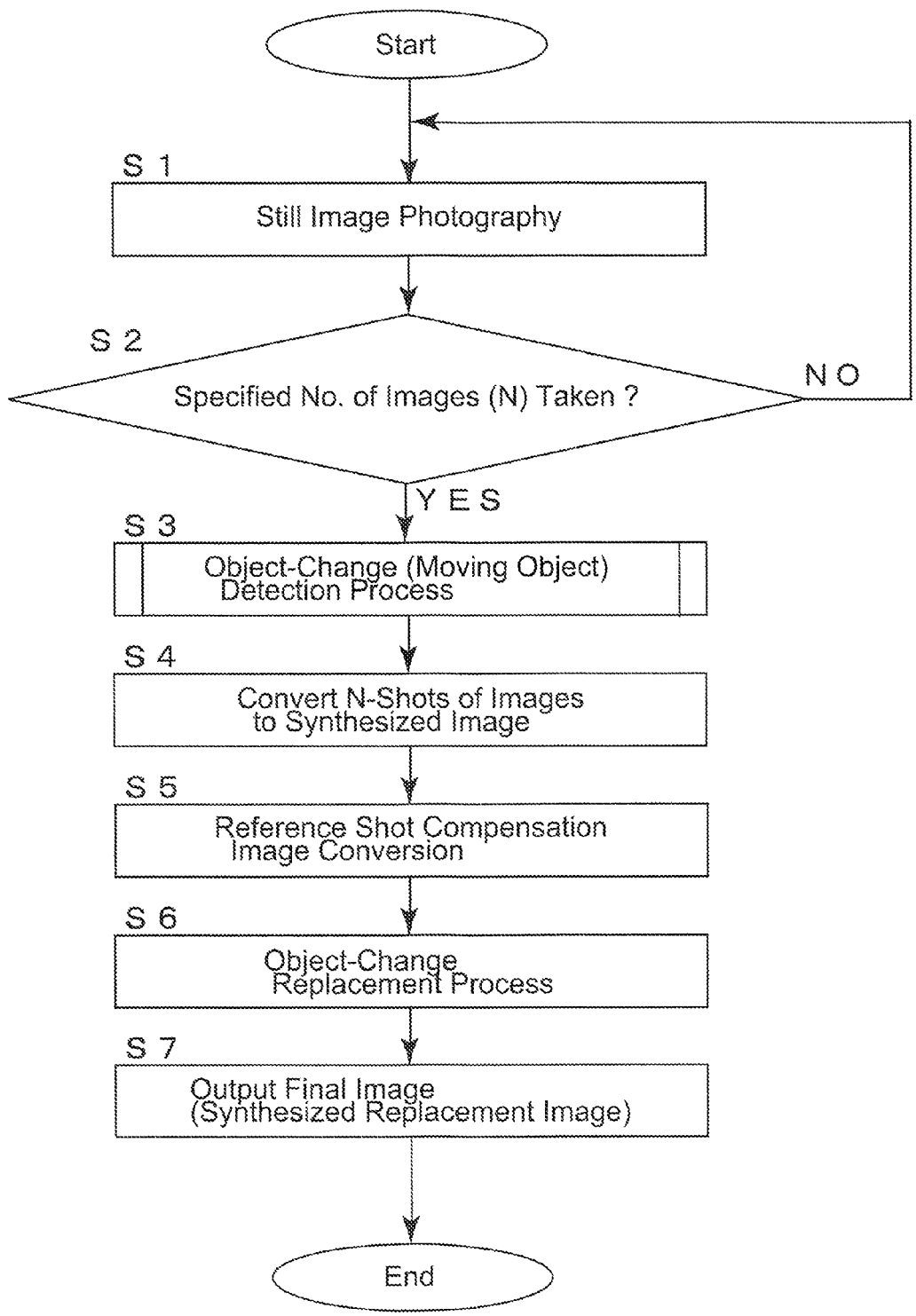
FIG. 12 shows a first flow chart of an PSR photographing process (PSR photographing mode) which is carried out by the digital camera of the illustrated embodiment.
Figure 13:
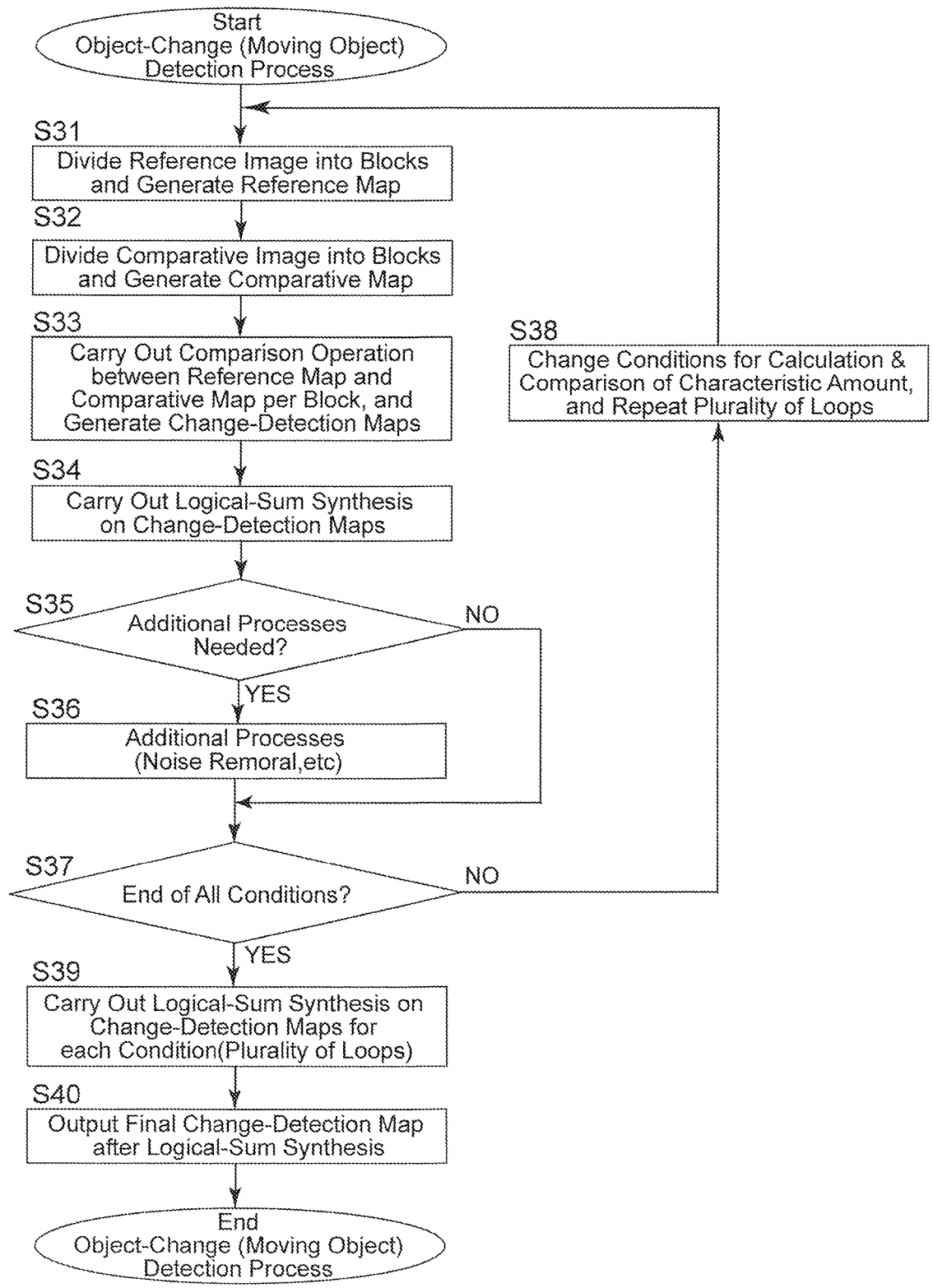
FIG. 13 shows a second flow chart of the PSR photographing process (PSR photographing mode) which is carried out by the digital camera of the illustrated embodiment.

The flowchart of FIG. 13 shows the subroutine of the "object-change (moving object) detection process" of step S3, shown in FIG. 12.

In step S31 of FIG. 13, the reference image is divided into blocks and a reference map (characteristic-amount map 0) is generated.

In step S32, the comparative images (pixel-shifted image) are divided into blocks and comparative maps (characteristic-amount map i) are generated.

In step S33, a comparison operation is carried out between the reference map (characteristic-amount map 0) and the comparative maps (characteristic-amount maps i) per block, and change-detection maps (1 through N−1) are generated.

In step S34, logical-sum synthesis is carried out on the change-detection maps (1 through N−1).

In step S35, it is determined whether an additional process (es) is needed. If it is determined that an additional process (es) is needed, an additional process(es) such as noise removal, etc., is carried out in step S36 and control proceeds to step S37. If it is determined that an additional process is not needed, control proceed to step S37 without carrying out any additional processes.

The processes from step S31 through to step S36 are repeated for a plurality of loops while changing the characteristic-amount calculation and changing the conditions of comparison (configuration of the comparison operation) in step S38 (step S37:NO). Upon completion of the plurality of loops of processes, all of the conditions have ended (step S37:YES) and control proceeds to step S39.

In step S39, the change-detection maps of each condition (of the plurality of loops) are logical-sum synthesized.

In step S40, a final change-detection map upon completion of logical-sum synthesis is output. The final change-detection map upon completion of logical-sum synthesis is used for the synthesized-image replacement process in the PSR photographing process of the illustrated embodiment.

The above-described embodiment discusses an example in which four photographing images, which are taken (imaged) in the PSR photographing mode (PSR photographing process) by driving (moving) the image sensor 22 in a square movement path at a pitch of one pixel in a plane orthogonal to the optical axis, are designated as the "plurality of sequentially photographed images". However, various design changes are possible since there is a certain degree of freedom in regard to the movement path and pitch by which the image sensor 22 is driven (moved), and also in regard to the number of images of the "plurality of sequentially photographed images". Furthermore, the direction in which the image sensor 22 is driven (moved) is not limited to within a plane that is orthogonal to the optical axis of the photographing optical system, so long as the driving (movement) direction of the image sensor 22 is different to that of the optical axis of the photographing optical system. In addition, the "plurality of sequentially photographed images" are not limited to images that are obtained (photographed/imaged) in the PSR photographing mode, so long as the images have been photographed (imaged) in succession while a change(s) has occurred in the photographing condition(s) of the same object (subject).

If the "plurality of sequentially photographed images" consists of two images, only one reference image and one comparative image are generated, and since the "plurality of sequentially photographed images" would be n "sequentially photographed images", (n being a positive integer), there would be one "reference image" and n−1 "comparative images". Therefore, if the "plurality of sequentially photographed images" consists of two images, only one "reference map" and one "comparative map" are generated, and since the "plurality of sequentially photographed images" would be n "sequentially photographed images" (n being a positive integer), there would be one "reference map" and n−1 "comparative maps".

In the above-described embodiment, the image sensor 22 is described as a "movable member" that is configured to drive (move) within a plane that is orthogonal to the optical axis; however, the present invention is not limited thereto. For example, a configuration is possible in which an optical element constituting at least a part of the photographing lens group (photographing optical system) 31 can be used as a "movable member" which is driven (moved) in a plane that is orthogonal to the optical axis by a voice coil motor provided in the photographing lens 30. Alternatively, a configuration is possible in which an optical element that includes at least part of both the image sensor 22 and the photographing lens group 31 is used as a "movable member" that is driven (moved) within a plane that is orthogonal to the optical axis.

In the above-described embodiment, although the DSP 40 and the image sensor drive circuit 60 are portrayed as separate components (blocks), it is also possible to configure these components as a single component (block).

In the above-described embodiment, although an example of a configuration of the image-shake correction device 50 is described in which the magnets M1, M2 and M3 and the yokes Y1, Y2 and Y3 are fixed onto the mount support plate 51, and the drive coils C1, C2 and C3 are fixed onto the movable stage 52; a reversed positional relationship is possible in which magnets and yokes are fixed onto a movable stage, and drive coils are fixed onto a mount support plate.

In the above-described embodiment, although an example in which the camera body 20 and the photographing lens 30 are detachably attached to each other (lens interchangeable)

has been discussed, a configuration in which the camera body 20 and the photographing lens 30 are not detachable (non lens interchangeable) is also possible.

Although the digital camera 10 has been described herein as a photographing apparatus to which the present invention is applied, the present invention can also be applied to any device which includes a lens system, an image sensor and an image processor, for example: a smart device that is provided with an in-built digital camera (photographing apparatus) such as a smart phone or a tablet computer, or a video camera that is capable of taking a plurality of still images (pictures).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A photographing apparatus comprising:
    an image sensor which sequentially images a plurality of images;
    an image processor which is configured to set one image of said plurality of images as a reference image, and to set each remaining image of said plurality of images as a comparative image;
    an image processor which is configured to generate a reference map by dividing said reference image into a plurality of blocks;
    an image processor which is configured to generate a comparative map by dividing said comparative image into a plurality of blocks;
    an image processor which is configured to generate a change-detection map which indicates one of a coinciding block and a non-coinciding block between said reference map and said comparative map, per each respective said plurality of blocks thereof, by performing a comparison operation between said reference map and each said comparative map per each respective said plurality of blocks thereof;
    an image processor which is configured to obtain a synthesized image by synthesizing said plurality of images; and
    an image processor which is configured to replace at least a part of said synthesized image with a corresponding part of said reference image based on said change-detection map.

2. The photographing apparatus according to claim 1, wherein said image processors comprise a single image processor.

3. The photographing apparatus according to claim 1, wherein a plurality of said comparative maps are provided with respect to one said reference map,
    wherein said image processor that is configured to generate a change-detection map is configured to generate a plurality of said change-detection maps in a comparison operation between said one reference map and said plurality of change-detection maps, and
    wherein said photographing apparatus comprises an image processor which is configured to logical-sum synthesize said plurality of said change-detection maps.

4. The photographing apparatus according to claim 1, wherein said image processor that is configured to generate a change-detection map is configured to generate a plurality of loops of change-detection maps in a comparison operation between said one reference map and each said change-detection map, wherein a configuration of said comparison operation has been changed at each of said plurality of loops of change-detection maps, and
    wherein said photographing apparatus comprises an image processor which is configured to logical-sum synthesize said plurality of loops of change-detection maps.

5. The photographing apparatus according to claim 1, further comprising: an image processor which is configured to remove noise from said change-detection map.

6. The photographing apparatus according to claim 1, further comprising: an image processor which is configured to perform a blurring process at border areas between said coinciding blocks and said non-coinciding blocks of said change-detection map.

7. The photographing apparatus according to claim 1, wherein said plurality of images have been imaged using an image sensor which is configured to convert an object image formed by said photographing optical system into electrical pixel signals,
    wherein at least one of said image sensor and an optical element, which constitutes at least part of said photographing optical system, constitutes a movable member, and
    wherein said image sensor images said plurality of images while said movable member is moved in a direction that is different from that of said optical axis of said photographing optical system with object-emanating light rays being made incident on a plurality of pixels, having different detection colors, of said image sensor upon each movement of said movable member.

8. The photographing apparatus of claim 1, wherein said each remaining image of said plurality of images being set as said comparative image comprise images as captured by said image sensor.

9. The photographing apparatus of claim 1, wherein replacing said at least a part of said synthesized image with said corresponding part of said reference image based on said change-detection map comprises a replacement synthesizing process together with a weight-summing process in accordance with a synthesizing ratio on border areas of the non-coinciding blocks of the change-detection map.

10. A photographing method, comprising:
    sequentially imaging a plurality of images;
    setting one image of said plurality of images as a reference image, and setting each remaining image of said plurality of images as a comparative image;
    generating a reference map by dividing said reference image into a plurality of blocks;
    generating a comparative map for each said comparative image by dividing each said comparative image into a plurality of blocks;
    generating a change-detection map which indicates one of a coinciding block and a non-coinciding block between said reference map and said comparative map, per each respective said plurality of blocks, by performing a comparison operation between said reference map and said comparative map per each respective said plurality of blocks thereof;
    obtaining a synthesized image by synthesizing said plurality of images; and
    replacing at least part of said synthesized image with a corresponding part of said reference image based on said change-detection map.

11. An image processor configured to perform image processing operations, the operations comprising:

setting one image of a plurality of images, which have been sequentially imaged, as a reference image and set each remaining image of said plurality of images as a comparative image;

generating a reference map of said reference image, said reference map being divided into a plurality of blocks;

generating a reference map of said reference image, said reference map being divided into a plurality of blocks;

generating a comparative map of said comparative image, said comparative map being divided into a plurality of blocks;

generating a change-detection map which indicates one of a coinciding block and a non-coinciding block between said reference map and said comparative map, per each respective said plurality of blocks thereof, upon said reference map and said comparative map being compared in a comparison operation per each respective said plurality of blocks thereof;

obtaining a synthesized image by synthesizing said plurality of images; and replacing at least a part of said synthesized image with a corresponding part of said reference image based on said change-detection map.

12. An image-processing method, comprising:

setting one image of a plurality of images, which have been sequentially imaged, as a reference image and setting each remaining image of said plurality of images as a comparative image;

generating a reference map by dividing said reference image into a plurality of blocks;

generating a comparative map for each said comparative image by dividing each said comparative image into a plurality of blocks;

generating a change-detection map which indicates one of a coinciding block and a non-coinciding block between said reference map and said comparative map, per each respective said plurality of blocks, by performing a comparison operation between said reference map and said comparative map per each respective said plurality of blocks thereof;

obtaining a synthesized image by synthesizing said plurality of images; and replacing at least part of said synthesized image with a corresponding part of said reference image based on said change-detection map.

13. A processor of a computer apparatus configured to execute a program, when executed by the processor, cause the processor to perform operations comprising:

setting one image of a plurality of images, which have been sequentially imaged, as a reference image and setting each remaining image of said plurality of images as a comparative image;

generating a reference map by dividing said reference image into a plurality of blocks;

generating a comparative map for each said comparative image by dividing each said comparative image into a plurality of blocks;

generating a change-detection map which indicates one of a coinciding block and a non-coinciding block between said reference map and said comparative map, per each respective said plurality of blocks, by performing a comparison operation between said reference map and said comparative map per each respective said plurality of blocks thereof;

obtaining a synthesized image by synthesizing said plurality of images; and replacing at least part of said synthesized image with a corresponding part of said reference image based on said change-detection map.

\* \* \* \* \*